United States Patent
Peng et al.

(10) Patent No.: US 11,695,290 B2
(45) Date of Patent: Jul. 4, 2023

(54) POWER SUPPLY METHOD, CONTROL METHOD, POWER SOURCE, AND DETECTION APPARATUS

(71) Applicant: Huawei Digital Power Technologies Co., Ltd., Shenzhen (CN)

(72) Inventors: Jianhua Peng, Shenzhen (CN); Xingjie Wang, Dongguan (CN); Xuejuan Kong, Dongguan (CN)

(73) Assignee: Huawei Digital Power Technologies Co., Ltd., Shenzhen (CN)

(*) Notice: Subject to any disclaimer, the term of this patent is extended or adjusted under 35 U.S.C. 154(b) by 0 days.

(21) Appl. No.: 17/483,475

(22) Filed: Sep. 23, 2021

(65) Prior Publication Data

US 2022/0014032 A1    Jan. 13, 2022

Related U.S. Application Data

(63) Continuation of application No. PCT/CN2019/127747, filed on Dec. 24, 2019.

(30) Foreign Application Priority Data

Mar. 28, 2019  (CN) .......................... 201910243885.0

(51) Int. Cl.
*H02M 3/04*  (2006.01)
*H02J 7/00*  (2006.01)
*H02M 7/04*  (2006.01)

(52) U.S. Cl.
CPC ............. *H02J 7/0068* (2013.01); *H02M 3/04* (2013.01); *H02M 7/04* (2013.01)

(58) Field of Classification Search
None
See application file for complete search history.

(56) References Cited

U.S. PATENT DOCUMENTS 8,217,626 B2 * 7/2012 Winger ................ H02J 7/0068
320/152
2002/0186576 A1  12/2002 Kanouda et al.
(Continued)

FOREIGN PATENT DOCUMENTS

| CN | 1794738 A | 6/2006 |
|---|---|---|
| CN | 100512327 C | 7/2009 |

(Continued)

*Primary Examiner* — Jeffery S Zweizig
(74) *Attorney, Agent, or Firm* — Leydig, Voit & Mayer, Ltd.

(57) ABSTRACT

Embodiments of this application disclose a power supply method, a control method, a power source, and a detection apparatus, to improve power supply efficiency of a power supply system. The method in the embodiments of this application includes: converting a voltage input into a power source into a first voltage, and supplying power to an energy-consuming component based on the first voltage; obtaining status information obtained after the energy-consuming component is powered on, where the status information includes identification information of the energy-consuming component or current working status information of the energy-consuming component; determining a second voltage based on the status information; and converting the voltage input into the power source into the second voltage, and supplying power to the energy-consuming component based on the second voltage.

16 Claims, 8 Drawing Sheets

(56) References Cited

U.S. PATENT DOCUMENTS

2005/0012395 A1 1/2005 Eckroad et al.
2017/0256984 A1 9/2017 Ding et al.

FOREIGN PATENT DOCUMENTS

| CN | 102346540 A | 2/2012 |
|----|-------------|--------|
| CN | 102388521 A | 3/2012 |
| CN | 102684268 A | 9/2012 |
| CN | 103427640 A | 12/2013 |
| CN | 106647903 A | 5/2017 |
| CN | 106816866 A | 6/2017 |
| CN | 206819287 U | 12/2017 |
| CN | 110086240 A | 8/2019 |
| EP | 2117099 A1 | 11/2009 |
| EP | 3386148 A1 | 10/2018 |

* cited by examiner

POWER SUPPLY METHOD, CONTROL METHOD, POWER SOURCE, AND DETECTION APPARATUS

CROSS-REFERENCE TO RELATED APPLICATIONS

This application is a continuation of International Application No. PCT/CN2019/127747, filed on Dec. 24, 2019, which claims priority to China National Intellectual Property Administration No. 201910243885.0, filed on Mar. 28, 2019. The disclosures of the aforementioned applications are hereby incorporated by reference in their entireties.

TECHNICAL FIELD

This application relates to the electrical field, and in particular, to a power supply method, a control method, a power source, and a detection apparatus.

BACKGROUND

With development of communications technologies and advent of a fifth generation (5G) era, power consumption of a building baseband unit (BBU) and a radio frequency module (radio remote unit, RRU/active antenna unit, AAU) is multiplied, a power supply energy consumption problem is becoming increasingly serious, and reducing base station energy consumption has become a top priority. Reducing base station energy consumption may start from improving efficiency of a power conversion module between devices in a base station, reducing power supply nodes while ensuring normal power supply, reducing a cable loss in a power supply process, or the like. Reducing a cable loss mainly includes reducing a cable loss between a power source of the base station and an energy-consuming component of the base station.

Currently, an existing power supply architecture of a 48 V communications base station is shown in FIG. 1. A power source is directly connected to a radio frequency module and a battery. When mains electricity is normal, an AC to DC converter (AC/DC) in the power source converts the mains electricity into a direct current, and supplies power to the battery and the radio frequency module, and the battery stores electric energy. When the mains electricity is abnormal, the battery storing electric energy supplies power to the radio frequency module.

However, in the power supply architecture, both the battery and the radio frequency module are directly connected to an output busbar of the power source. When the mains electricity is normal, an output voltage of the power source is passively affected by a charging characteristic of the battery, namely, an equalized/float charging voltage. Consequently, power supply efficiency of a power supply system cannot be improved by adjusting the output voltage of the power source.

SUMMARY

Embodiments of this application disclose a power supply method, a control method, a power source, and a detection apparatus, so that the power source can adjust an output voltage based on status information obtained after an energy-consuming component is powered on, thereby improving power supply efficiency of a power supply system.

In view of this, a first aspect of the embodiments of this application provides a power supply method. The method may include the following:

A power conversion module is built in a power source. The power conversion module is directly connected to an energy-consuming component, and may be configured to implement functions of AC/DC conversion and voltage conversion. When supplying power to the energy-consuming component, the power conversion module converts a voltage input into the power source into a first voltage, and directly supplies power to the energy-consuming component based on the first voltage. After the energy-consuming component is powered on, the power source may obtain status information of the energy-consuming component by using a built-in control module. The status information includes identification information of the energy-consuming component or current working status information of the energy-consuming component, namely, information used to indicate a characteristic of the energy-consuming component. The control module determines a second voltage based on the status information, and indicates the power conversion module to convert the voltage input into the power source into the second voltage, in other words, adjust the output voltage of the power supply from the first voltage to the second voltage, so that the power source supplies power to the energy-consuming component based on the second voltage.

Optionally, in some embodiments of this application, the converting a voltage input into the power source into a first voltage, and supplying power to the energy-consuming component based on the first voltage includes: converting, when mains electricity is normal, input mains electricity into a direct current, converting a voltage input by the mains electricity into the first voltage, and supplying power to the energy-consuming component based on the first voltage; or converting, when mains electricity is abnormal, a voltage input by a battery into the first voltage, and supplying power to the energy-consuming component based on the first voltage. In the embodiments of this application, to improve power supply stability, when the mains electricity is abnormal and fails to supply power, the power source may receive the voltage input by the battery, convert the voltage into the first voltage, and supply power to the energy-consuming component. The first voltage may be preset.

Optionally, in some embodiments of this application, after the converting, when mains electricity is normal, input mains electricity into a direct current, converting a voltage input by the mains electricity into the first voltage, and supplying power to the energy-consuming component based on the first voltage, the method may further include: converting the first voltage into a third voltage, and supplying power to the battery based on the third voltage. In the embodiments of this application, when the mains electricity is normal, the power source is further configured to: convert the voltage input by the mains electricity into the third voltage, and supply power to the battery by using the third voltage, so that the battery stores electric energy when the mains electricity is normal. The third voltage is adjusted based on a charging characteristic of the battery.

Optionally, in some embodiments of this application, the status information includes model information of the energy-consuming component; and the determining a second voltage based on the status information includes: determining voltage level information and a maximum steady-state input voltage of the energy-consuming component by querying a preset comparison table based on the model information, where the preset comparison table includes a correspondence between different model information and voltage level information and maximum steady-state input voltages; and if it is determined, based on the voltage level information, that a voltage supported by the energy-consuming component is less than or equal to a preset voltage, determining that the second voltage is a preset second voltage; or if it is determined, based on the voltage level information, that a voltage supported by the energy-consuming component is greater than the preset voltage, obtaining the second voltage based on the maximum steady-state input voltage and a preset closed-loop feedback control system, where the closed-loop feedback control system is used to improve steady-state performance of a system. In the embodiments of this application, the status information obtained by the power source after the energy-consuming component is powered on is further described. The status information may include the model information of the energy-consuming component, so that the power source can adjust the output voltage of the power source based on the model information, and supply power to the energy-consuming component based on an adjusted voltage. Because the power source adjusts the output voltage of the power source based on the model information, the voltage supported by the energy-consuming component may be determined based on the model information. If the supported voltage is high, a relatively high voltage value is output, so that the output voltage of the power source is improved, and a cable loss is also reduced, thereby improving power supply efficiency of the power source.

Optionally, in some embodiments of this application, the status information includes load power percentage information of the energy-consuming component; and the determining a second voltage based on the status information includes: determining an optimal voltage based on the load power percentage information and a rule table, where the optimal voltage is an output voltage of the power source when input power of the power source is minimum at a determined load power percentage, and a correspondence between different load power percentages and different optimal voltages is preset in the rule table; and determining that the second voltage is the optimal voltage. In the embodiments of this application, the status information obtained by the power source after the energy-consuming component is powered on is further described. The status information may include the load power percentage information of the energy-consuming component. The load power percentage information indicates a ratio of current power of the energy-consuming component to maximum power, in other words, indicates a current operating status or operating class of the energy-consuming component. Therefore, the power source may set the output voltage based on the operating status of the device. Specifically, the power source determines an optimal output voltage based on comparison between a load power percentage and the rule table. Because the rule table records output voltages when input power of the power source is minimum at different classes, when the power source adjusts the output voltage to an optimal voltage corresponding to the class, the input voltage of the power source is minimum, in other words, minimum input power is used to implement normal operation of the energy-consuming component, so that power supply efficiency of the power source is improved.

A second aspect of the embodiments of this application provides a control method. The method may include the following operations.

After an energy-consuming component is powered on, a detection apparatus detects status information of the energy-consuming component. The status information includes identification information of the energy-consuming component or current working status information of the energy-consuming component. Then the detection apparatus sends the status information to a power source, so that the power source adjusts an output voltage of the power source from a first voltage to a second voltage based on the status information, and supplies power to the energy-consuming component based on the second voltage. In this embodiment of this application, the detection apparatus may be a standalone device, and is connected to the energy-consuming component to detect the status information, for example, a smart meter, or integrated into the energy-consuming component as a detection unit. If the detection apparatus is a standalone device, the detection apparatus may share a power supply line with the energy-consuming component, or power may be supplied to the detection apparatus and the energy-consuming component independently. The detection apparatus has a communication connection to the power source. After the energy-consuming component is powered on, the detection apparatus detects the status information of the energy-consuming component, and sends the status information to the power source, so that the power source adjusts the output voltage based on the status information of the energy-consuming component, to meet a power supply efficiency requirement of a power supply system.

Optionally, in some embodiments of this application, the status information includes model information of the energy-consuming component or load power percentage information of the energy-consuming component. In the embodiments of this application, the status information is further described, so that operability of the solution is improved.

A third aspect of the embodiments of this application provides a power source. The power source may include:

a power conversion module and a control module, where the power conversion module is connected to an energy-consuming component, where:

the power conversion module is configured to: convert a voltage input into the power source into a first voltage, and supply power to the energy-consuming component based on the first voltage;

the control module is configured to: obtain status information obtained after the energy-consuming component is powered on, where the status information includes identification information of the energy-consuming component or current working status information of the energy-consuming component, and determine a second voltage based on the status information; and the power conversion module is further configured to: convert the voltage input into the power source into the second voltage, and supply power to the energy-consuming component based on the second voltage.

Optionally, in some embodiments of this application, the power conversion module includes an AC to DC conversion submodule and a DC to DC conversion submodule, both the AC to DC conversion submodule and the DC to DC conversion submodule are connected to the energy-consuming component, and the AC to DC conversion submodule and the DC to DC conversion submodule are connected.

When mains electricity is normal, the AC to DC conversion submodule is configured to: convert input mains electricity into a direct current, convert a voltage input by the mains electricity into the first voltage, and supply power to the energy-consuming component based on the first voltage, and is further configured to: convert the voltage input by the mains electricity into a direct current, convert the voltage input by the mains electricity into the second voltage, and supply power to the energy-consuming component based on the second voltage.

Alternatively, when the mains electricity is abnormal, the DC to DC conversion submodule is configured to: convert a voltage input by a battery into the first voltage, and supply power to the energy-consuming component based on the first voltage, and is further configured to: convert the voltage input by the battery into the second voltage, and supply power to the energy-consuming component based on the second voltage.

Optionally, in some embodiments of this application, when the mains electricity is normal, the DC to DC conversion submodule is further configured to: convert the first voltage into a third voltage, and supply power to the battery based on the third voltage.

Optionally, in some embodiments of this application, the status information includes model information of the energy-consuming component; and the control module is specifically configured to: determine voltage level information and a maximum steady-state input voltage of the energy-consuming component by querying a preset comparison table based on the model information, where the preset comparison table includes a correspondence between different model information and voltage level information and maximum steady-state input voltages; and if it is determined, based on the voltage level information, that a voltage supported by the energy-consuming component is less than or equal to a preset voltage, determine that the second voltage is a preset second voltage; or if it is determined, based on the voltage level information, that a voltage supported by the energy-consuming component is greater than the preset voltage, obtain the second voltage based on the maximum steady-state input voltage and a preset closed-loop feedback control system, where the closed-loop feedback control system is used to improve steady-state performance of a system.

Optionally, in some embodiments of this application, the status information includes load power percentage information of the energy-consuming component; and the control module is specifically configured to: determine an optimal voltage based on the load power percentage information and a rule table, where the optimal voltage is an output voltage of the power source when input power of the power source is minimum at a determined load power percentage, and a correspondence between different load power percentages and different optimal voltages is preset in the rule table; and determine that the second voltage is the optimal voltage.

A fourth aspect of the embodiments of this application provides a detection apparatus.

The detection apparatus includes a detection module and a feedback module, where the detection module is configured to: after an energy-consuming component is powered on, detect status information of the energy-consuming component, where the status information includes identification information of the energy-consuming component or current working status information of the energy-consuming component; and the feedback module is configured to send the status information to a power source, so that the power source adjusts an output voltage of the power source from a first voltage to a second voltage based on the status information, and supplies power to the energy-consuming component based on the second voltage.

Optionally, in some embodiments of this application, the status information includes model information of the energy-consuming component or load power percentage information of the energy-consuming component.

A fifth aspect of the embodiments of this application provides a power supply system.

The power supply system includes a power source and a detection apparatus, where the power source includes a power conversion module and a control module, where the power conversion module is connected to an energy-consuming component;

the detection apparatus includes a detection module and a feedback module;

the power conversion module is configured to: convert a voltage input into the power source into a first voltage, and supply power to the energy-consuming component based on the first voltage;

the detection module is configured to: after the energy-consuming component is powered on, detect status information of the energy-consuming component, where the status information includes identification information of the energy-consuming component or current working status information of the energy-consuming component;

the feedback module is configured to send the status information to the control module;

the control module is configured to determine a second voltage based on the status information; and the power conversion module is further configured to: convert the voltage input into the power source into the second voltage, and supply power to the energy-consuming component based on the second voltage.

Optionally, in some embodiments of this application, the power supply system further includes a battery, the power conversion module includes an AC to DC conversion submodule and a DC to DC conversion submodule, both the AC to DC conversion submodule and the DC to DC conversion submodule are connected to the energy-consuming component, and the AC to DC conversion submodule and the DC to DC conversion submodule are connected.

When mains electricity is normal, the AC to DC conversion submodule is configured to: convert input mains electricity into a direct current, convert a voltage input by the mains electricity into the first voltage, and supply power to the energy-consuming component based on the first voltage, and is further configured to: convert the voltage input by the mains electricity into a direct current, convert the voltage input by the mains electricity into the second voltage, and supply power to the energy-consuming component based on the second voltage.

Alternatively, when the mains electricity is abnormal, the DC to DC conversion submodule is configured to: convert a voltage input by the battery into the first voltage, and supply power to the energy-consuming component based on the first voltage, and is further configured to: convert the voltage input by the battery into the second voltage, and supply power to the energy-consuming component based on the second voltage.

Optionally, in some embodiments of this application, when the mains electricity is normal, the DC to DC conversion submodule is further configured to: convert the first voltage into a third voltage, and supply power to the battery based on the third voltage.

Optionally, in some embodiments of this application, the status information includes model information of the energy-consuming component; and the control module is specifically configured to: determine voltage level information and a maximum steady-state input voltage of the energy-consuming component by querying a preset comparison table based on the model information, where the preset comparison table includes a correspondence between different model information and voltage level information and maximum steady-state input voltages; and if it is determined, based on the voltage level information, that a voltage supported by the energy-consuming component is less than or equal to a preset voltage, determine that the second voltage is a preset second voltage; or if it is determined, based on the voltage level information, that a voltage supported by the energy-consuming component is greater than the preset voltage, obtain the second voltage based on the maximum steady-state input voltage and a preset closed-loop feedback control system, where the closed-loop feedback control system is used to improve steady-state performance of the system.

Optionally, in some embodiments of this application, the status information includes load power percentage information of the energy-consuming component; and the control module is specifically configured to: determine an optimal voltage based on the load power percentage information and a rule table, where the optimal voltage is an output voltage of the power source when input power of the power source is minimum at a determined load power percentage, and a correspondence between different load power percentages and different optimal voltages is preset in the rule table; and determine that the second voltage is the optimal voltage.

A sixth aspect of the embodiments of this application provides a computer storage medium including instructions. When the instructions run on a computer, the computer performs the method according to any one of the implementations of the first aspect or the second aspect.

A seventh aspect of the embodiments of this application provides a computer program product. When the computer program product runs on a computer, the computer performs the method according to any one of the implementations of the first aspect or the second aspect.

It can be learned from the foregoing technical solutions that the embodiments of this application have the following advantages.

The power source converts the input voltage into the first voltage, and supplies power to the energy-consuming component based on the first voltage. In the power supply process, the power source obtains the status information obtained after the energy-consuming component is powered on, where the status information includes the identification information of the energy-consuming component or the current working status information of the energy-consuming component, and then the power source adjusts the output voltage from the first voltage to the second voltage based on the status information, and supplies power to the energy-consuming component based on the second voltage. In comparison with the prior art in which an output voltage of a power source is passively affected by a float charging voltage of a battery, in the power supply process, the power source adjusts the output voltage based on the obtained status information obtained after the energy-consuming component is powered on, in other words, adjusts the output voltage of the power source by improving power supply efficiency, so that power supply efficiency of the entire system can be improved.

DESCRIPTION OF EMBODIMENTS

With development of a 5G technology, energy consumption of a radio frequency module and a voltage supported by the radio frequency module also increase accordingly. If a current power supply and distribution system is still used, because an output busbar of a power source is externally connected to a battery, an output voltage of the power source is affected by a discharging depth and an equalized/float charging voltage of the battery, and therefore cannot actively perform regulation. When the battery is discharged deeply, a voltage of the battery is reduced, causing a decrease in a voltage applied to both ends of the radio frequency module and an increase in a cable loss.

Figure 1:
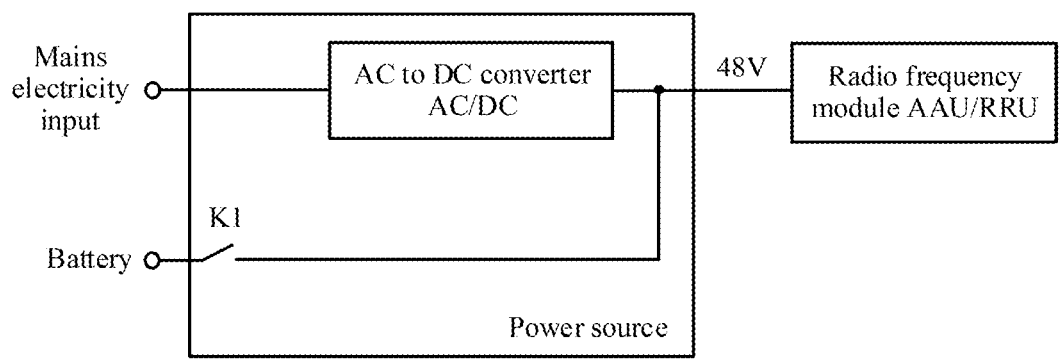
FIG. 1 is a schematic diagram of a power supply architecture of a 48 V communications base station, according to an embodiment of this application.
Figure 2:
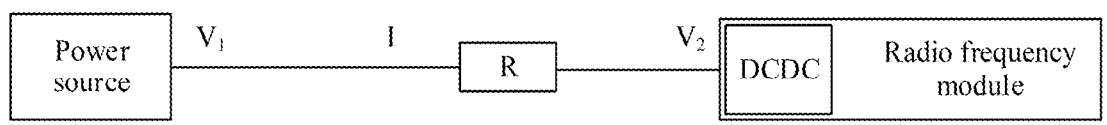
FIG. 2 is a schematic diagram of a model graph of an electric energy loss from a power source to a radio frequency module end, according to an embodiment of this application.

The radio frequency module serves as one of the main energy-consuming components of a base station. FIG. 2 is a model graph of an electric energy loss from the power source to a radio frequency module end. V1 is an output voltage of the power source. V1 is a voltage applied to both ends of the radio frequency module, I is a cable current, R is a cable resistance, and DC/DC is a DC to DC conversion module (DC/DC) built in the radio frequency module. From the power source of the base station to an output cable and then to a load end, there are mainly three parts of losses: $P_{power\ source\ loss}$, $P_{cable\ loss}$, and $P_{radio\ frequency\ module\ loss}$. $P_{power\ supply\ loss} = P_{power\ source\ loss} + P_{cable\ loss} + P_{radio\ frequency\ module\ loss}$. $P_{power\ source\ loss}$ mainly includes a loss caused by efficiency of a power module built in the power source, $P_{cable\ loss}$ mainly includes a loss caused by a cable resistance between the power source and the radio frequency module during power supply, and $P_{radio\ frequency\ module\ loss}$ mainly includes a loss caused by efficiency of a secondary power module built in the radio frequency module. As technologies progress, efficiency of the built-in power modules of the power source or the radio frequency module has reached a relatively high level. For example, a communications power source provides reliable and efficient power output for the base station, and serves as a power supply core of the power source of the communications base station, and conversion efficiency of a power module of the communications power source reaches 98%. The radio frequency module serves as an energy-consuming component, and efficiency of the secondary power module built in the radio frequency module reaches 96%. Currently, a power supply efficiency improvement still mainly focuses on an efficiency improvement of the power module. However, an advance in a power electronics technology mainly depends on component development, and currently, due to a limitation of component development, a performance-to-price ratio may be reduced even if efficiency is improved by 0.1%. To further significantly improve efficiency of the power source, relatively high costs need to be paid. In addition, improvement is limited.

Therefore, first of all, system power supply efficiency may be improved by reducing the cable loss.

Based on the model graph of the electric energy loss shown in FIG. 2, the following formulas may be obtained:

$$V1 = I \times R + V2 \qquad \text{Formula 1:}$$

$$P_{RXU} = I \times V2 \qquad \text{Formula 2:}$$

$$P_{cable\ loss} = I2 \times R \qquad \text{Formula 3:}$$

The radio frequency module is an energy-consuming component with constant power, in other words, power $P_{RXU}$ of the radio frequency module is a fixed value. Therefore, $$P_{cableloss} = \left(\frac{P_{RXU}}{V_2}\right)^2 \times R$$

may be obtained.

$$V_2 = \frac{V_1 + \sqrt{V_1^2 - 4P_{RXU} \times R}}{2}$$

may be calculated according to formula 1 and formula 2. Therefore, formula 4 may be obtained:

$$P_{cableloss} = \frac{2 \times P_{RXU}^2 \times R}{V_1^2 + V_1 \times \sqrt{V_1^2 - 4P_{RXU} \times R} - 2 \times P_{RXU} \times R}.$$

It can be learned from the foregoing formula 4 that the output voltage of the power source is negatively correlated with the cable loss. Therefore, the output voltage $V_1$ of the power source may be increased to reduce the cable loss.

In a power supply architecture in the prior art, an output voltage of a power source is passively affected by an equalized/float charging voltage, and therefore, cannot improve power supply efficiency by regulating an output voltage of the power source.

Based on the foregoing description, the embodiments of this application provide a power supply method, a control method, a power source, and a detection apparatus, so that the power source adjusts an output voltage of the power source by using obtained status information of an energy-consuming component, thereby improving power supply efficiency of the power source.

In this embodiment of this application and subsequent embodiments, an example in which an energy-consuming component is a radio frequency module is used for description. However, it should be noted that the energy-consuming component includes but is not limited to the radio frequency module. In some possible cases, for example, when power is supplied to a building baseband unit, there is a problem similar to that existing when power is supplied to the radio frequency module, and adaptive modification may be performed to be applicable to the case in which power is supplied to the building baseband unit.

Figure 3A:
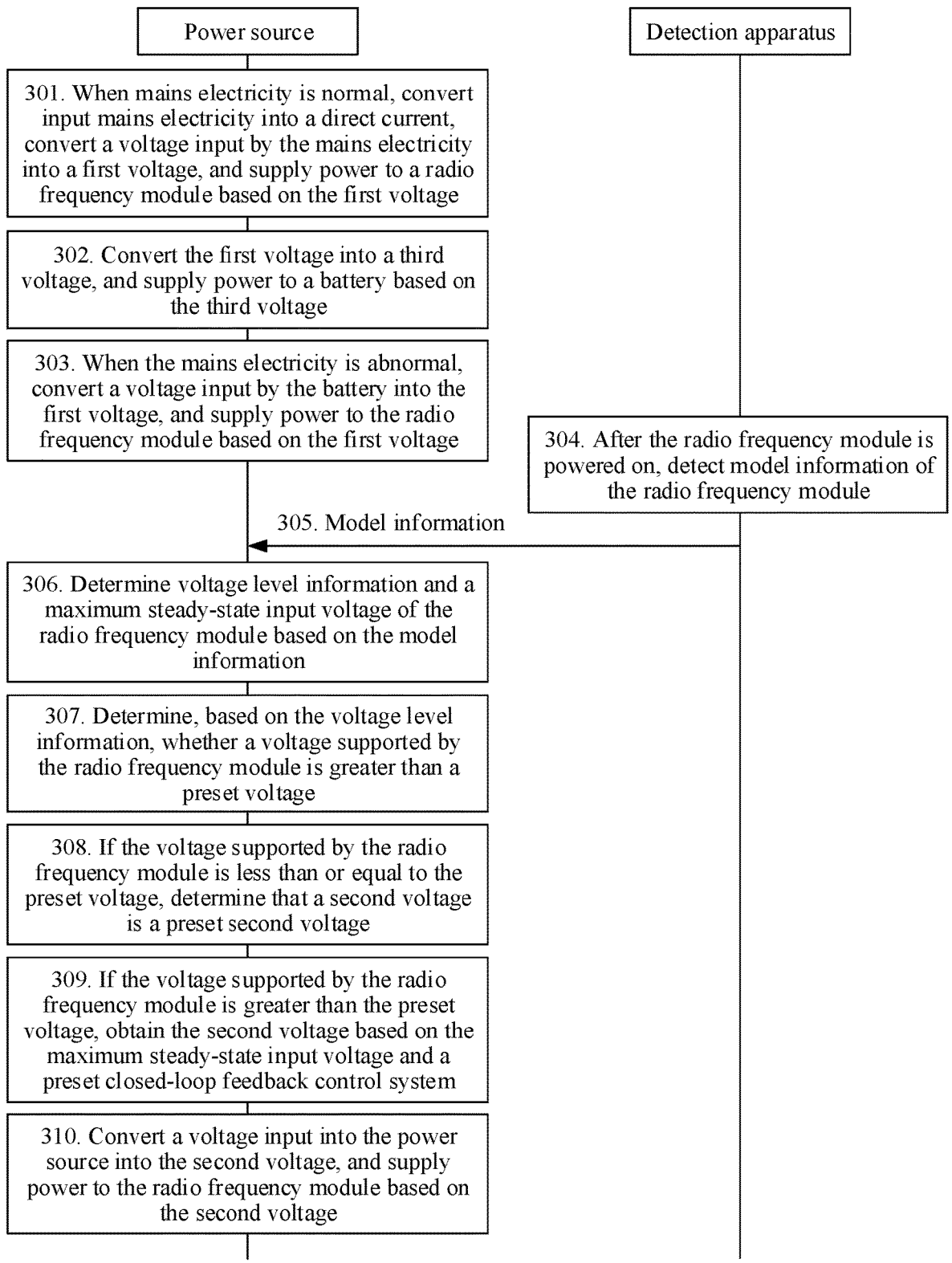
FIG. 3A is a schematic diagram of an embodiment of a power supply method, according to the embodiments of this application.

FIG. 3A is a schematic diagram of an embodiment of a power supply method, according to the embodiments of this application. The method may include the following steps.

301. When mains electricity is normal, a power source converts input mains electricity into a direct current, converts a voltage input by the mains electricity into a first voltage, and supplies power to a radio frequency module based on the first voltage.

In this embodiment, the power source is externally connected to the mains electricity, the power source includes a power conversion module, and the power conversion module is connected to the radio frequency module. When the mains electricity is normal, an AC to DC conversion submodule of the power conversion module converts the mains electricity into the direct current, converts the voltage input by the mains electricity into the first voltage, and supplies power to the radio frequency module based on the first voltage. The first voltage may be preset. For example, the first voltage is an initial start voltage of an energy-consuming device. To avoid damage to the energy-consuming device and prevent the first voltage from exceeding an allowable voltage of the energy-consuming device, the first voltage may be set to a relatively small value.

302. The power source converts the first voltage into a third voltage, and supplies power to a battery based on the third voltage.

In this embodiment, the power source may further include a DC to DC conversion submodule, and the DC to DC conversion submodule is connected to the AC to DC conversion submodule and the battery. After obtaining input of the mains electricity, the AC to DC conversion submodule outputs the first voltage, and supplies power to the DC to DC conversion submodule. The DC to DC conversion submodule converts the first voltage into the third voltage, and supplies power to the battery. For example, if a voltage supported by the radio frequency module is relatively high, a voltage output by the AC to DC conversion submodule is 57 V, and an input voltage allowed by the battery is 48 V, the DC to DC conversion submodule may reduce the voltage of 57 V to 48 V, to supply power to the battery.

Optionally, in some possible implementations, if a similar DC to DC conversion submodule is built in the battery, and can be configured to convert an externally input voltage into a voltage allowed when the battery is being charged, the power source does not need to include the DC to DC conversion submodule.

303. When the mains electricity is abnormal, the power source converts a voltage input by the battery into the first voltage, and supplies power to the radio frequency module based on the first voltage.

In this embodiment, the DC to DC conversion submodule in the power source is also connected to the radio frequency module. When the mains electricity is abnormal, the power source obtains, by using the DC to DC conversion submodule, the voltage input by the battery, and converts the voltage input by the battery into the first voltage, so that power continues to be supplied to the radio frequency module at the first voltage, thereby ensuring power supply stability.

304. After the radio frequency module is powered on, a detection apparatus detects model information of the radio frequency module.

In this embodiment, the detection apparatus may be a unit integrated into the radio frequency module, or may be connected to the radio frequency module as a standalone device. For example, the detection apparatus may be a smart meter connected to the radio frequency module. After the radio frequency module is powered on, a detection module is also powered on. The detection module includes a detection unit, configured to detect the model information of the radio frequency module.

305. The detection apparatus sends the model information to the power source.

In this embodiment, the detection apparatus may further include a communications module. The communications module may be a wireless communications module (e.g., a radio frequency (RF) wireless data communication module) or another type of communications element. After the detection module of the detection apparatus detects the model information of the radio frequency module, the communications module sends the model information to the power source.

Optionally, in some possible implementations, the detection apparatus is connected to a power module through a data cable. After the detection module detects the model information of the radio frequency module, the detection apparatus sends the model information to the power module through the data cable.

306. The power source determines voltage level information and a maximum steady-state input voltage of the radio frequency module based on the model information.

In this embodiment, after obtaining the model information, the power source may search, for the voltage level information and the maximum steady-state input voltage corresponding to the model information, a locally preset comparison table or through the Internet. The comparison table includes a correspondence between radio frequency modules of all model information and voltage level information and maximum steady-state input voltages. As shown in Table 1, Table 1 is an illustrative table of the comparison table. The voltage level information indicates the voltage supported by the radio frequency module, and may be a voltage range or a determined voltage value. The maximum steady-state input voltage is a preset parameter corresponding to the radio frequency module.

TABLE 1

| Device model | Voltage level | Maximum steady-state input voltage |
| --- | --- | --- |
| E4-3233 | 48 V | 47 V |
| E6-5B | 48 V-57 V | 55 V |
| S4-122 | 72 V | 72 V |
| ... | ... | ... |

307. The power source determines, based on the voltage level information, whether the voltage supported by the radio frequency module is greater than a preset voltage.

In this embodiment, after determining the voltage level information, the power source determines, by using the voltage level information, whether the voltage supported by the radio frequency module is greater than the preset voltage. If the voltage that is supported by the radio frequency module and that is determined based on a voltage level is a range of voltages, it is determined whether a maximum voltage within the range is greater than the preset voltage.

308. If the voltage supported by the radio frequency module is less than or equal to the preset voltage, the power source determines that a second voltage is a preset second voltage.

In this embodiment, if the power source determines that the voltage supported by the radio frequency module is less than or equal to the preset voltage, the power source determines that the second voltage is the preset second voltage. The preset second voltage is preconfigured in the power source. For example, if the first voltage is a default voltage started by a system, and is set to 30 V, and the preset voltage is 60 V, and after the power source determines a model of the radio frequency module, the power source determines, based on the voltage level, that the voltage supported by the radio frequency module is less than 60 V, the power source adjusts an output voltage to a preset voltage of 57 V. The voltage of 57 V is the preset second voltage.

309. If the voltage supported by the radio frequency module is greater than the preset voltage, the power source obtains the second voltage based on the maximum steady-state input voltage and a preset closed-loop feedback control system, where the closed-loop feedback control system is used to improve steady-state performance of the system.

In this embodiment, if the power source determines that the voltage supported by the radio frequency module is greater than the preset voltage, the power source uses the maximum steady-state input voltage of the radio frequency module as a reference voltage, inputs the reference voltage into the preset closed-loop feedback control system, and calculates the second voltage. The preset closed-loop feedback control system is used to enable a voltage value applied to both ends of the radio frequency module to remain in a stable state, and the closed-loop feedback control system may be updated through the Internet.

Figure 3B:
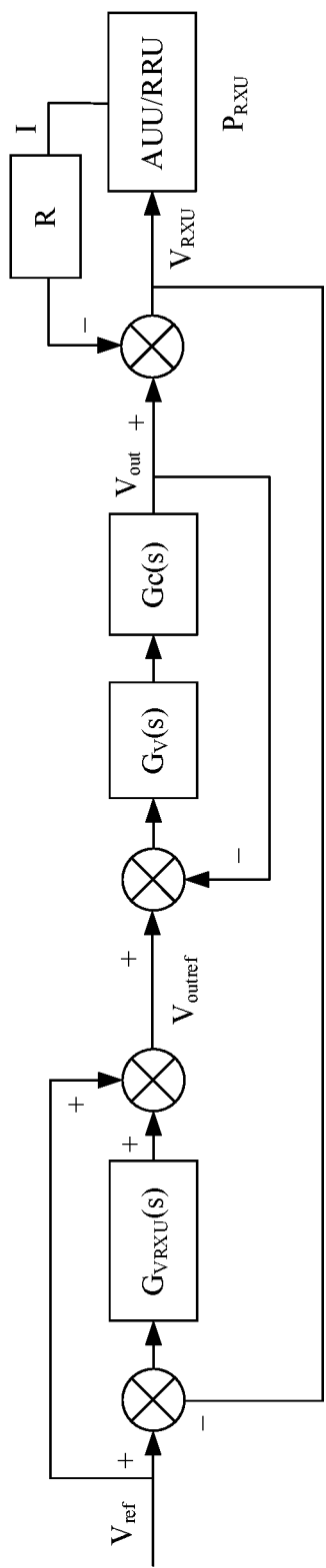
FIG. 3B is a schematic diagram of an embodiment of a closed-loop control system, according to the embodiments of this application.

A schematic diagram of the closed-loop control system is shown in FIG. 3B. $V_{RXU}$ is a voltage of an input port of the radio frequency module AAU/RRU, I is a power supply loop current, $P_{RXU}$ is power consumption of RXU, R is power supply loop impedance, $V_{ref}$ is a given reference value of a voltage of an RXU port, $G_{VRXU}(s)$ is a controller transfer function of an RXU input port voltage loop, where a proportional integral controller (PI) is used herein, $V_{outRef}$ is an output of the RXU input port voltage loop, the output is a given value of the output voltage of the power source, $G_V(s)$ is a controller transfer function of a power source output voltage loop, $G_c(s)$ is a power source model transfer function, and loop output Vout is the output voltage of the power source.

310. The power source converts a voltage input into the power source into the second voltage, and supplies power to the radio frequency module based on the second voltage.

In this embodiment, after the power source determines the second voltage, if power is supplied by the mains electricity, the AC to DC conversion module built in the power source is set to convert input mains electricity into a direct current and convert a voltage input by the mains electricity into the determined second voltage, to supply power to the radio frequency module at the second voltage. If power is supplied by the battery, the DC to DC conversion module built in the power source converts a voltage input by the battery into the second voltage, and supplies power to the radio frequency module at the second voltage.

It can be learned from the foregoing technical solutions that this embodiment of this application has the following advantages.

While supplying power to the radio frequency module, the power source receives the model information of the radio frequency module that is sent after the detection apparatus detects the model information, so that the power source can adjust the output voltage from the first voltage to the second voltage based on the model information, to supply power to the radio frequency module. In the power supply process, the output voltage is adjusted based on the voltage supported by the radio frequency module. If the radio frequency module supports a higher voltage, the output voltage remains at a relatively high level, so that a cable loss is reduced, and power supply efficiency of the entire power supply system is improved.

Figure 4A:
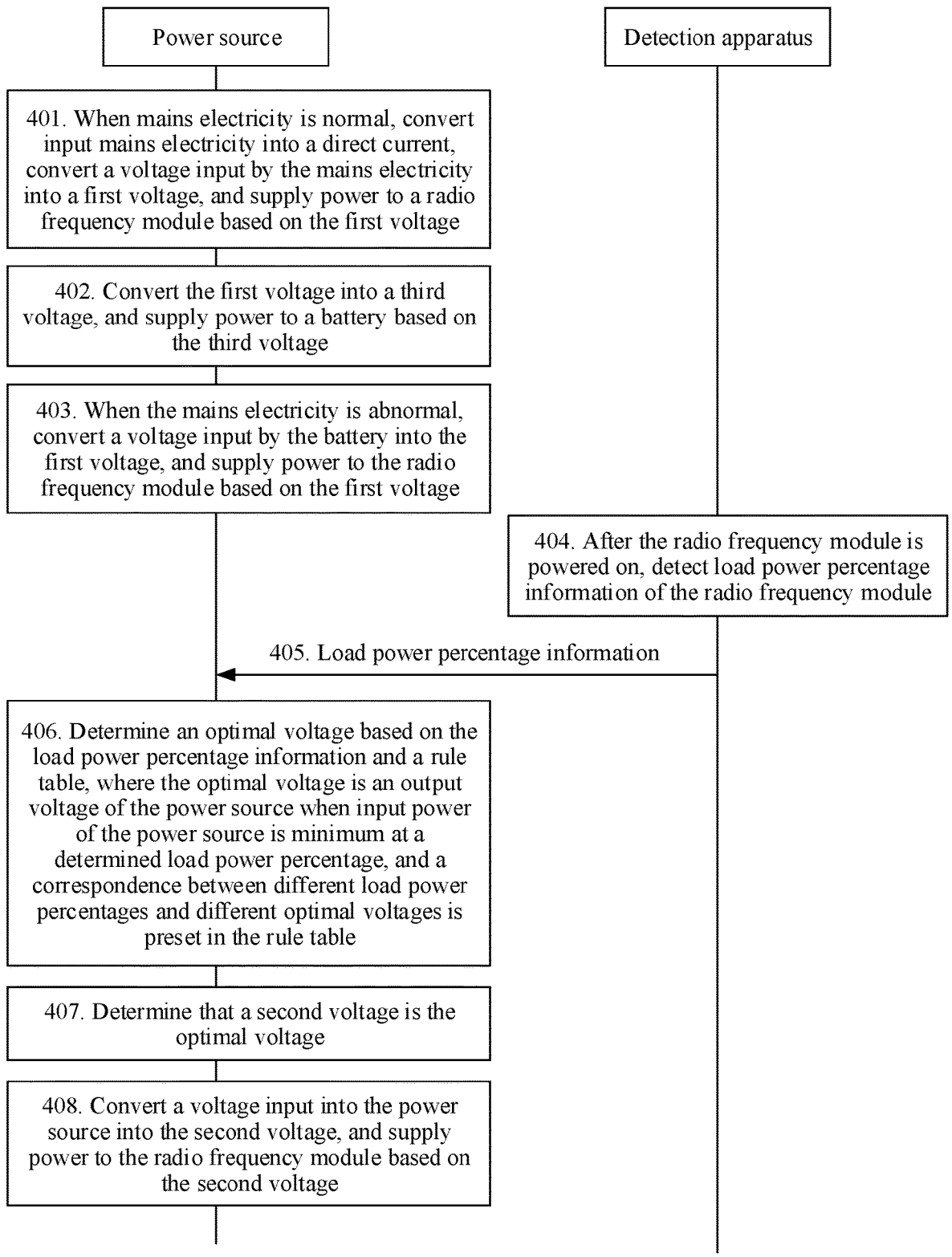
FIG. 4A is a schematic diagram of another embodiment of a power supply method, according to the embodiments of this application.

FIG. 4A is a schematic diagram of another embodiment of a power supply method, according to the embodiments of this application. The method may include the following steps.

401. When mains electricity is normal, a power source converts input mains electricity into a direct current, converts a voltage input by the mains electricity into a first voltage, and supplies power to a radio frequency module based on the first voltage.

402. The power source converts the first voltage into a third voltage, and supplies power to a battery based on the third voltage.

403. When the mains electricity is abnormal, the power source converts a voltage input by the battery into the first voltage, and supplies power to the radio frequency module based on the first voltage.

It should be noted that step 401 to step 403 are similar to step 301 to step 303 in the embodiment shown in FIG. 3A, and details are not described herein again.

404. After the radio frequency module is powered on, a detection apparatus detects load power percentage information of the radio frequency module.

In this embodiment, the detection apparatus may be a unit integrated into the radio frequency module, or may be connected to the radio frequency module as a standalone device. For example, the detection apparatus may be a smart meter connected to the radio frequency module. After the radio frequency module is powered on, a detection module of the radio frequency module detects the load power percentage information of the current radio frequency module. The load power percentage information indicates a ratio of current power to rated maximum power of the radio frequency module, and is used to indicate a current working status of the radio frequency module.

405. The detection apparatus sends the load power percentage information to the power source.

In this embodiment, the detection apparatus may further include a communications module. The communications module may be a wireless communications module (RF wireless data communication module). After the detection module of the detection apparatus detects the load power percentage information of the radio frequency module, the communications module sends the load power percentage information to the power source.

Optionally, in some possible implementations, the detection apparatus is connected to a power module through a data cable. After the detection module detects the model information of the radio frequency module, the detection apparatus sends the model information to the power module through the data cable.

406. The power source determines an optimal voltage based on the load power percentage information and a rule table, where the optimal voltage is an output voltage of the power source when input power of the power source is minimum at a determined load power percentage, and a correspondence between different load power percentages and different optimal voltages is preset in the rule table.

In this embodiment, after determining the current load power percentage information of the radio frequency module, the power source queries the rule table pre-stored in the power source or from a main control device of the power source, to query an optimal voltage corresponding to the power source from the rule table in a case of the load power percentage.

Figure 4B:
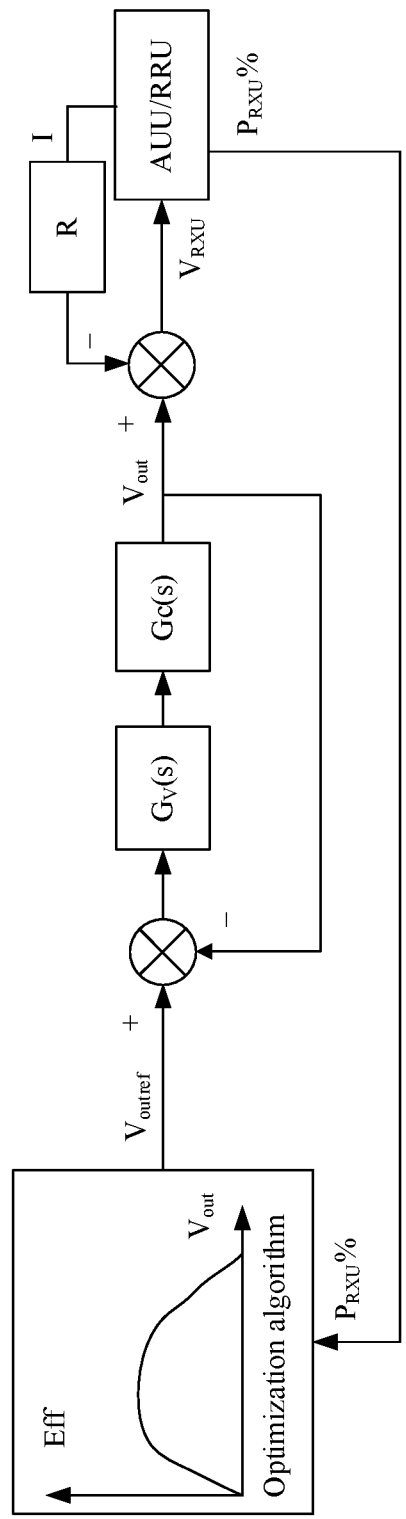
FIG. 4B is a schematic diagram of an embodiment of an optimization control system, according to the embodiments of this application.

It should be noted that corresponding output voltages of the power source in cases of different load power percentages are preset in the rule table. The optimal voltage is determined by using a preset optimization control system, and a schematic block diagram of the optimization control system is shown in FIG. 4B. As shown in FIG. 4B, in the schematic block diagram, a reference voltage of an output voltage of the power source is determined based on an optimization algorithm, the calculated reference voltage is input into a subsequent closed-loop control system to obtain a steady-state voltage, and the steady-state voltage is output as a final output voltage. Specifically, the optimization algorithm may be briefly described as follows: An optimal voltage of each power class is searched for based on the load power percentage information fed back by the radio frequency module, to achieve optimal energy consumption in any working condition, where $P_{RXU}\%$ is the load power percentage. $P_{RXU}\%$ may be a plurality of power classes: 0, 10%, 20%, 30%, 40%, . . . , and 100% with a ±5% range. To be specific, at each determined class X %, the output voltage of the power source is changed in ascending order of values in a power supply range of the radio frequency module, and input power of the power source is detected to find minimum input power of the power source in the power supply range when the radio frequency module works normally. An output voltage of the power supply in this case is an optimal-efficiency output voltage working point of the power class X %, and the output voltage in this case is an optimal output voltage, which is also referred to as an optimal voltage. For the class X %, the voltage value is stored and recorded in the rule table. Similarly, an optimal voltage corresponding to each class may be recorded and stored in the rule table, and the rule table is updated at specified intervals. For example, the optimal voltage corresponding to each class may be re-measured every 10 days in an idle period of a system, and the rule table is updated based on data obtained through measurement. The rule table may be stored in the main control device of the power source or pre-stored in the power source, so that a current optimal output voltage of the power source can be subsequently determined based on load power percentage information.

407. The power source determines that a second voltage is the optimal voltage.

In this embodiment, after determining the optimal voltage, the power source determines the optimal voltage as the second voltage.

408. The power source converts a voltage input into the power source into the second voltage, and supplies power to the radio frequency module based on the second voltage.

In this embodiment, after the power source determines the second voltage, if power is supplied by the mains electricity, an AC to DC conversion module built in the power source is set to convert input mains electricity into a direct current and convert a voltage input by the mains electricity into the determined second voltage, to supply power to the radio frequency module at the second voltage. If power is supplied by the battery, the power source sets a DC to DC conversion module built in the power source to convert a voltage input by the battery into the second voltage and supply power to the radio frequency module at the second voltage.

It can be learned from the foregoing technical solutions that this embodiment of this application has the following advantages:

In the process in which the power source supplies power to the radio frequency module, the power source receives the load power percentage information sent by the radio frequency module. The load power percentage information indicates the ratio of the current power to the rated maximum power of the radio frequency module. The power source determines the current optimal voltage of the power source based on the information, adjusts the output voltage from the first voltage to the optimal voltage, and then supplies power to the radio frequency module at the optimal voltage. It can be learned from the foregoing that in comparison with the prior art, in the power supply process, the power source adjusts the output voltage based on a working status of the radio frequency module, and an adjusted output voltage is an output voltage when input power of the power source is minimum at a current load generation class, so that power supply efficiency of the system can be effectively improved in comparison with the prior art.

Figure 5A:
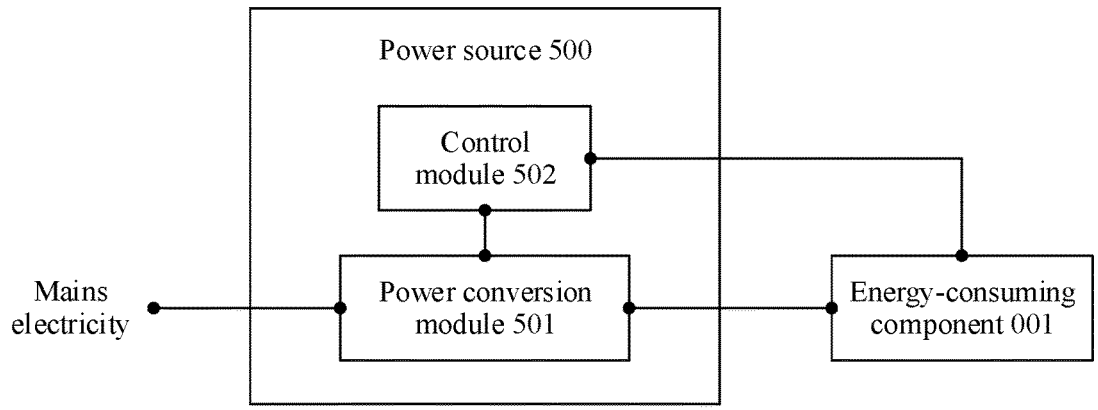
FIG. 5A is a schematic diagram of an embodiment of a power source, according to the embodiments of this application.

FIG. 5A is a schematic diagram of an embodiment of a power source, according to the embodiments of this application. The power source may include:

a power conversion module 501 and a control module 502, where the power conversion module 501 is connected to an energy-consuming component 001, where the power conversion module 501 is configured to: convert a voltage input into the power source 500 into a first voltage, and supply power to the energy-consuming component 001 based on the first voltage;

the control module 502 is configured to: obtain status information obtained after the energy-consuming component 001 is powered on, where the status information includes identification information of the energy-consuming component 001 or current working status information of the energy-consuming component 001, and determine a second voltage based on the status information; and the power conversion module 501 is further configured to: convert the voltage input into the power source 500 into the second voltage, and supply power to the energy-consuming component 001 based on the second voltage.

Figure 5B:
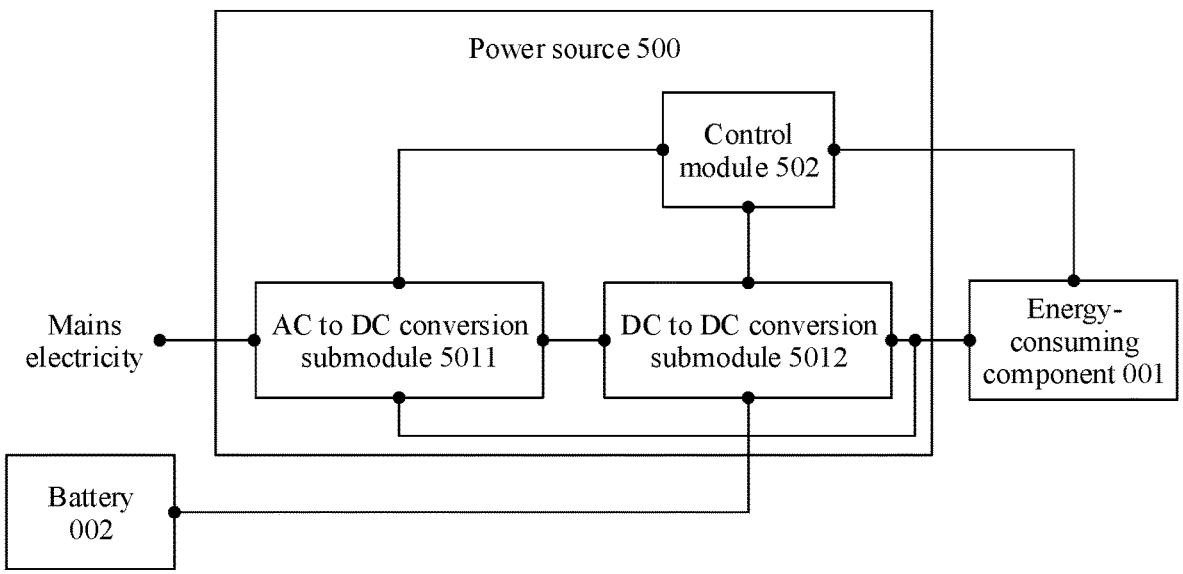
FIG. 5B is a schematic diagram of another embodiment of a power source, according to the embodiments of this application.

FIG. 5B is a schematic diagram of another embodiment of the power source 500, according to some embodiments of this application.

The power conversion module 501 includes an AC to DC conversion submodule 5011 and a DC to DC conversion submodule 5012, both the AC to DC conversion submodule 5011 and the DC to DC conversion submodule 5012 are connected to the energy-consuming component 001, and the AC to DC conversion submodule 5011 and the DC to DC conversion submodule 5012 are connected.

When mains electricity is normal, the AC to DC conversion submodule 5011 is configured to: convert input mains electricity into a direct current, convert a voltage input by the mains electricity into the first voltage, and supply power to the energy-consuming component 001 based on the first voltage, and is further configured to: convert the voltage input by the mains electricity into a direct current, convert the voltage input by the mains electricity into the second voltage, and supply power to the energy-consuming component 001 based on the second voltage.

Alternatively, when the mains electricity is abnormal, the DC to DC conversion submodule 5012 is configured to: convert a voltage input by a battery 002 into the first voltage, and supply power to the energy-consuming component 001 based on the first voltage, and is further configured to: convert the voltage input by the battery 002 into the second voltage, and supply power to the energy-consuming component 001 based on the second voltage.

Optionally, in some embodiments of this application, when the mains electricity is normal, the DC to DC conversion submodule 5012 is further configured to: convert the first voltage into a third voltage, and supply power to the battery 002 based on the third voltage.

Optionally, in some embodiments of this application, the status information includes model information of the energy-consuming component 001; and the control module 502 is specifically configured to: determine voltage level information and a maximum steady-state input voltage of the energy-consuming component 001 by querying a preset comparison table based on the model information, where the preset comparison table includes a correspondence between different model information and voltage level information and maximum steady-state input voltages; and if it is determined, based on the voltage level information, that a voltage supported by the energy-consuming component 001 is less than or equal to a preset voltage, determine that the second voltage is a preset second voltage; or if it is determined, based on the voltage level information, that a voltage supported by the energy-consuming component 001 is greater than the preset voltage, obtain the second voltage based on the maximum steady-state input voltage and a preset closed-loop feedback control system, where the closed-loop feedback control system is used to improve steady-state performance of a system.

Optionally, in some embodiments of this application, the status information includes load power percentage information of the energy-consuming component 001; and the control module 502 is specifically configured to: determine an optimal voltage based on the load power percentage information and a rule table, where the optimal voltage is an output voltage of the power source 500 when input power of the power source 500 is minimum at a determined load power percentage, and a correspondence between different load power percentages and different optimal voltages is preset in the rule table; and determine that the second voltage is the optimal voltage.

Figure 6:
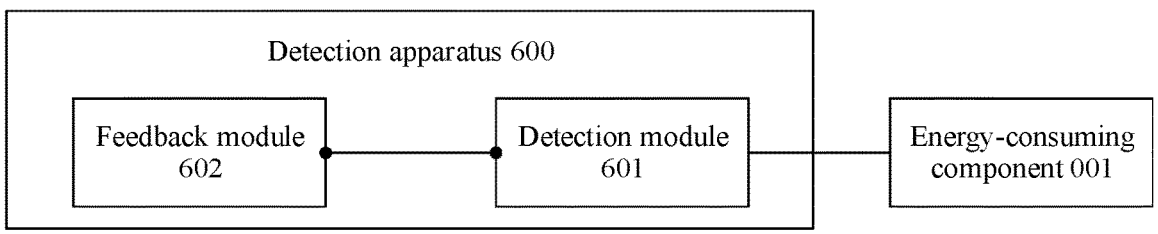
FIG. 6 is a schematic diagram of an embodiment of a detection apparatus, according to the embodiments of this application.

FIG. 6 is a schematic diagram of an embodiment of a detection apparatus, according to some embodiments of this application.

The detection apparatus 600 includes a detection module 601 and a feedback module 602.

The detection module 601 is configured to: after an energy-consuming component 001 is powered on, detect status information of the energy-consuming component 001, where the status information includes identification information of the energy-consuming component 001 or current working status information of the energy-consuming component 001.

The feedback module 602 is configured to send the status information to a power source, so that the power source adjusts an output voltage of the power source from a first voltage to a second voltage based on the status information, and supplies power to the energy-consuming component 001 based on the second voltage.

Optionally, in some embodiments of this application, the status information includes model information of the energy-consuming component 001 or load power percentage information of the energy-consuming component 001.

Figure 7A:
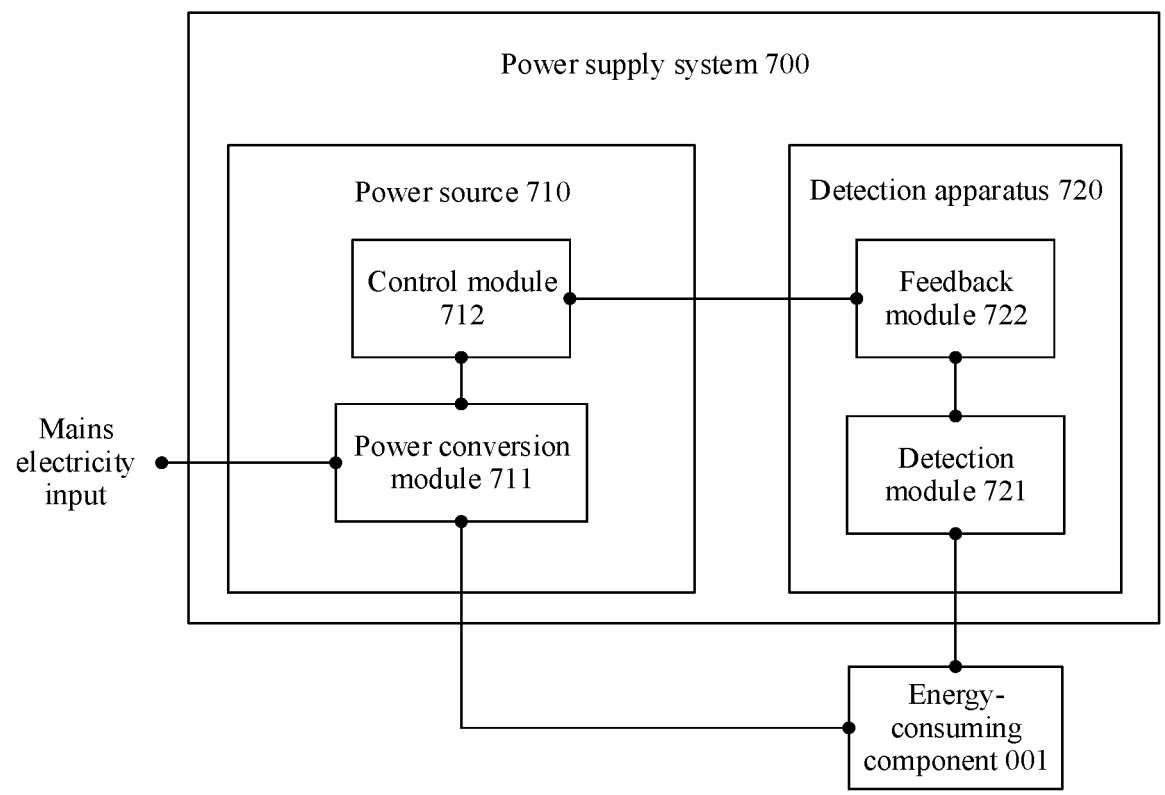
FIG. 7A is a schematic diagram of an embodiment of a power supply system, according to the embodiments of this application.

FIG. 7A is a schematic diagram of an embodiment of a power supply system, according to some embodiments of this application.

The power supply system 700 includes a power source 710 and a detection apparatus 720.

The power source 710 includes a power conversion module 711 and a control module 712, where the power conversion module 711 is connected to an energy-consuming component 001.

The detection apparatus includes a detection module 721 and a feedback module 722.

The power conversion module 711 is configured to: convert a voltage input into the power source into a first voltage, and supply power to the energy-consuming component 001 based on the first voltage.

The detection module 721 is configured to: after the energy-consuming component 001 is powered on, detect status information of the energy-consuming component 001, where the status information includes identification information of the energy-consuming component 001 or current working status information of the energy-consuming component 001.

The feedback module 722 is configured to send the status information to the control module 712.

The control module 712 is configured to determine a second voltage based on the status information.

The power conversion module 711 is further configured to: convert the voltage input into the power source 710 into the second voltage, and supply power to the energy-consuming component 001 based on the second voltage.

Figure 7B:
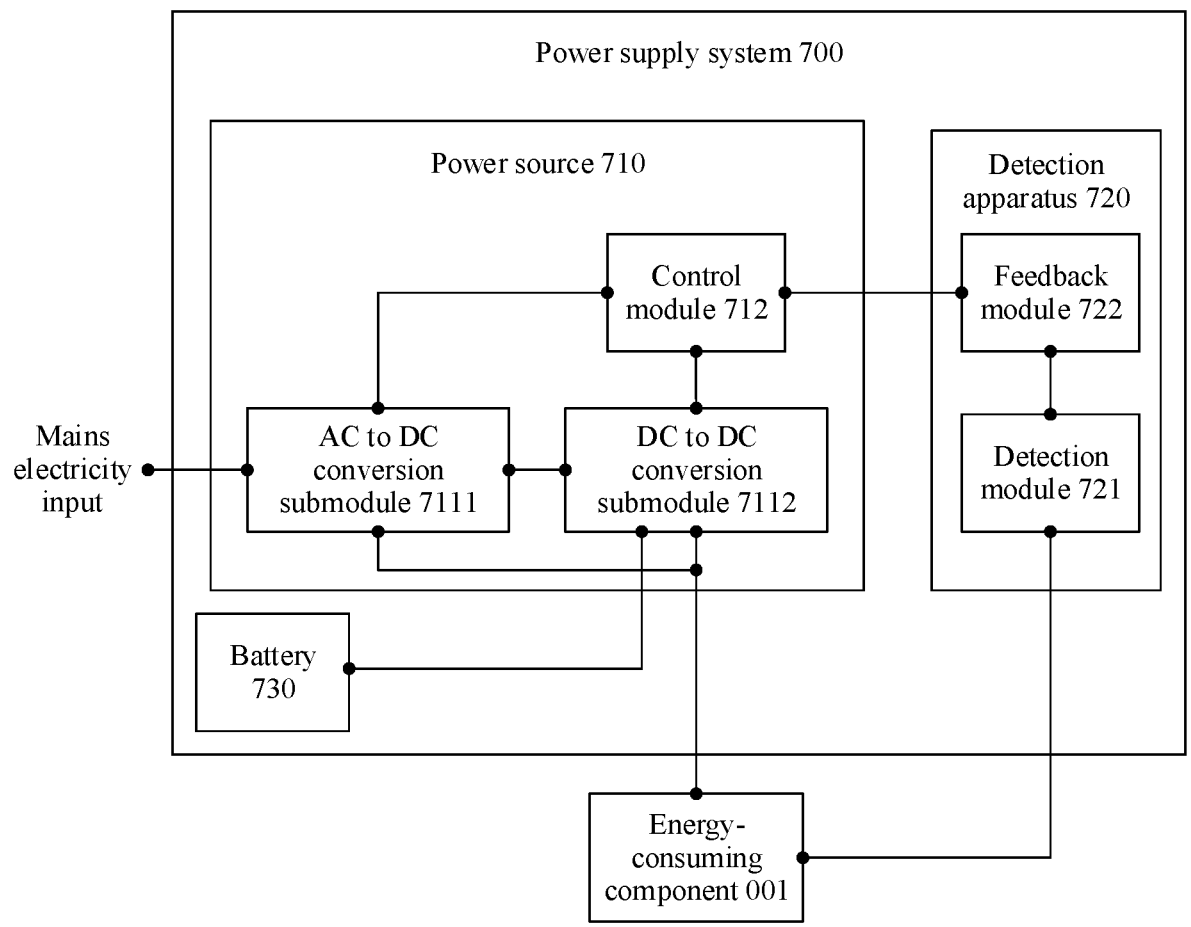
FIG. 7B is a schematic diagram of another embodiment of a power supply system, according to the embodiments of this application.

FIG. 7B is a schematic diagram of another embodiment of a power supply system, according to some embodiments of this application.

The power supply system further includes a battery 730, the power conversion module 711 includes an AC to DC conversion submodule 7111 and an DC to DC conversion submodule 7112, both the AC to DC conversion submodule 7111 and the AC to DC conversion submodule 7112 are connected to the energy-consuming component 001, and the AC to DC conversion submodule 7111 and the AC to DC conversion submodule 7112 are connected.

When mains electricity is normal, the AC to DC conversion submodule 7111 is configured to: convert input mains electricity into a direct current, convert a voltage input by the mains electricity into the first voltage, and supply power to the energy-consuming component 001 based on the first voltage, and is further configured to: convert the voltage input by the mains electricity into a direct current, convert the voltage input by the mains electricity into the second voltage, and supply power to the energy-consuming component 001 based on the second voltage.

Alternatively, when the mains electricity is abnormal, the AC to DC conversion submodule 7112 is configured to: convert a voltage input by the battery 730 into the first voltage, and supply power to the energy-consuming component 001 based on the first voltage, and is further configured to: convert the voltage input by the battery 730 into the second voltage, and supply power to the energy-consuming component 001 based on the second voltage.

Optionally, in some embodiments of this application, when the mains electricity is normal, the AC to DC conversion submodule 7112 is further configured to: convert the first voltage into a third voltage, and supply power to the battery 730 based on the third voltage.

Optionally, in some embodiments of this application, the status information includes model information of the energy-consuming component 001; and the control module 712 is specifically configured to: determine voltage level information and a maximum steady-state input voltage of the energy-consuming component 001 by querying a preset comparison table based on the model information, where the preset comparison table includes a correspondence between different model information and voltage level information and maximum steady-state input voltages; and if it is determined, based on the voltage level information, that a voltage supported by the energy-consuming component 001 is less than or equal to a preset voltage, determine that the second voltage is a preset second voltage; or if it is determined, based on the voltage level information, that a voltage supported by the energy-consuming component 001 is greater than the preset voltage, obtain the second voltage based on the maximum steady-state input voltage and a preset closed-loop feedback control system, where the closed-loop feedback control system is used to improve steady-state performance of the system.

Optionally, in some embodiments of this application, the status information includes load power percentage information of the energy-consuming component 001; and the control module 712 is specifically configured to: determine an optimal voltage based on the load power percentage information and a rule table, where the optimal voltage is an output voltage of the power source 710 when input power of the power source 710 is minimum at a determined load power percentage, and a correspondence between different load power percentages and different optimal voltages is preset in the rule table; and determine that the second voltage is the optimal voltage.

An embodiment of this application further provides a computer storage medium including instructions. When the instructions run on a computer, the computer performs the method according to any one of the embodiments shown in FIG. 3A or FIG. 4A.

An embodiment of this application further provides a computer program product including instructions. When the computer program product runs on a computer, the computer performs the method according to any one of the embodiments shown in FIG. 3A or FIG. 4A.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A power supply method, comprising:
converting a voltage input into a power source into a first voltage, and supplying power to an energy-consuming component based on the first voltage;
determining a second voltage based on status information obtained after the energy-consuming component is powered on, wherein the status information comprises identification information of the energy-consuming component or current working status information of the energy-consuming component, and wherein the status information is received wirelessly from a detection apparatus connected to the energy-consuming component; and
converting the voltage input into the power source into the second voltage, and supplying power to the energy-consuming component based on the second voltage.

2. The method according to claim 1, wherein:
the converting the voltage input into the power source into the first voltage, and supplying power to the energy-consuming component based on the first voltage comprises:
converting input mains electricity into a direct current, converting a voltage input by the mains electricity into the first voltage, and supplying power to the energy-consuming component based on the first voltage; or
converting a voltage input by a battery into the first voltage, and supplying power to the energy-consuming component based on the first voltage.

3. The method according to claim 2, wherein the method further comprises:
converting the first voltage into a third voltage, and supplying power to the battery based on the third voltage.

4. The method according to claim 1, wherein:
the status information comprises model information of the energy-consuming component; and
the determining the second voltage based on the status information comprises:
determining voltage level information and a maximum steady-state input voltage of the energy-consuming component by querying a preset comparison table based on the model information, wherein the preset comparison table comprises a correspondence between different model information and voltage level information and maximum steady-state input voltages; and
responsive to determining, based on the voltage level information, that a voltage supported by the energy-consuming component is less than or equal to a preset voltage, determining that the second voltage is a preset second voltage; or
responsive to determining, based on the voltage level information, that the voltage supported by the energy-consuming component is greater than the preset voltage, obtaining the second voltage based on the maximum steady-state input voltage and a preset closed-loop feedback control system.

5. The method according to claim 1, wherein:
the status information comprises load power percentage information of the energy-consuming component; and
the determining the second voltage based on the status information comprises:
determining an optimal voltage based on the load power percentage information and a rule table, wherein the optimal voltage is an output voltage of the power source when input power of the power source is a minimum at a determined load power percentage, and a correspondence between different load power percentages and different optimal voltages is preset in the rule table; and determining that the second voltage is the optimal voltage.

6. A computer program product comprising instructions, wherein when the instructions are run on a computer, the computer is enabled to perform the method of claim 1.

7. A power source, comprising:

a power conversion module connected to an energy-consuming component, and a control module, wherein:

the power conversion module is configured to: convert a voltage input into the power source into a first voltage, and supply power to the energy-consuming component based on the first voltage;

the control module is configured to: obtain status information obtained after the energy-consuming component is powered on, wherein the status information comprises identification information of the energy-consuming component or current working status information of the energy-consuming component, and determine a second voltage based on the status information; and the power conversion module is further configured to: convert the voltage input into the power source into the second voltage, and supply power to the energy-consuming component based on the second voltage, wherein the status information is received wirelessly from a detection apparatus connected to the energy-consuming component.

8. The power source according to claim 7, wherein the power conversion module comprises an AC to DC conversion submodule and a DC to DC conversion submodule, both the AC to DC conversion submodule and the DC to DC conversion submodule are connected to the energy-consuming component, and the AC to DC conversion submodule and the DC to DC conversion submodule are connected;

wherein the AC to DC conversion submodule is configured to: convert input mains electricity into a direct current, convert a voltage input by the mains electricity into the first voltage, and supply power to the energy-consuming component based on the first voltage, and is further configured to: convert the voltage input by the mains electricity into a direct current, convert the voltage input by the mains electricity into the second voltage, and supply power to the energy-consuming component based on the second voltage; or wherein the DC to DC conversion submodule is configured to: convert a voltage input by a battery into the first voltage, and supply power to the energy-consuming component based on the first voltage, and is further configured to: convert the voltage input by the battery into the second voltage, and supply power to the energy-consuming component based on the second voltage.

9. The power source according to claim 8, wherein:

the DC to DC conversion submodule is further configured to: convert the first voltage into a third voltage, and supply power to the battery based on the third voltage.

10. The power source according to claim 7, wherein:

the status information comprises model information of the energy-consuming component; and the control module is configured to: determine voltage level information and a maximum steady-state input voltage of the energy-consuming component by querying a preset comparison table based on the model information, wherein the preset comparison table comprises a correspondence between different model information and voltage level information and maximum steady-state input voltages; and responsive to determining, based on the voltage level information, that a voltage supported by the energy-consuming component is less than or equal to a preset voltage, determine that the second voltage is a preset second voltage; or responsive to determining, based on the voltage level information, that a voltage supported by the energy-consuming component is greater than the preset voltage, obtain the second voltage based on the maximum steady-state input voltage and a preset closed-loop feedback control system.

11. The power source according to claim 7, wherein:

the status information comprises load power percentage information of the energy-consuming component; and the control module is configured to: determine an optimal voltage based on the load power percentage information and a rule table, wherein the optimal voltage is an output voltage of the power source when input power of the power source is a minimum at a determined load power percentage, and a correspondence between different load power percentages and different optimal voltages is preset in the rule table; and determine that the second voltage is the optimal voltage.

12. A power supply system, comprising a power source and a detection apparatus, wherein:

the power source comprises a power conversion module connected to an energy-consuming component and a control module;

the detection apparatus includes a detection module and a feedback module;

the power conversion module is configured to: convert a voltage input into the power source into a first voltage, and supply power to the energy-consuming component based on the first voltage;

the detection module is configured to: after an energy-consuming component is powered on, detect status information of the energy-consuming component, wherein the status information comprises identification information of the energy-consuming component or current working status information of the energy-consuming component; and the feedback module is configured to send the status information to the control module wirelessly;

the control module is configured to determine a second voltage based on the status information; and the power conversion module is further configured to: convert the voltage input into the power source into the second voltage, and supply power to the energy-consuming component based on the second voltage.

13. The power supply system according to claim 12, wherein the power supply system further comprises a battery, the power conversion module comprises an AC to DC conversion submodule and a DC to DC conversion submodule, both the AC to DC conversion submodule and the DC to DC conversion submodule are connected to the energy-consuming component, and the AC to DC conversion submodule and the DC to DC conversion submodule are connected;

wherein the AC to DC conversion submodule is configured to: convert input mains electricity into a direct current, convert a voltage input by the mains electricity into the first voltage, and supply power to the energy-consuming component based on the first voltage, and is further configured to: convert the voltage input by the mains electricity into a direct current, convert the voltage input by the mains electricity into the second voltage, and supply power to the energy-consuming component based on the second voltage; or wherein the DC to DC conversion submodule is configured to: convert a voltage input by the battery into the first voltage, and supply power to the energy-consuming component based on the first voltage, and is further configured to: convert the voltage input by the battery into the second voltage, and supply power to the energy-consuming component based on the second voltage.

14. The power supply system according to claim 13, wherein:
the DC to DC conversion submodule is further configured to: convert the first voltage into a third voltage, and supply power to the battery based on the third voltage.

15. The power supply system according to claim 12, wherein:
the status information comprises model information of the energy-consuming component; and
the control module is configured to: determine voltage level information and a maximum steady-state input voltage of the energy-consuming component by querying a preset comparison table based on the model information, wherein the preset comparison table comprises a correspondence between different model information and voltage level information and maximum steady-state input voltages; and responsive to determining, based on the voltage level information, that a voltage supported by the energy-consuming component is less than or equal to a preset voltage, determine that the second voltage is a preset second voltage; or responsive to determining, based on the voltage level information, that a voltage supported by the energy-consuming component is greater than the preset voltage, obtain the second voltage based on the maximum steady-state input voltage and a preset closed-loop feedback control system.

16. The power supply system according to claim 12, wherein:
the status information comprises load power percentage information of the energy-consuming component; and
the control module is configured to: determine an optimal voltage based on the load power percentage information and a rule table, wherein the optimal voltage is an output voltage of the power source when input power of the power source is a minimum at a determined load power percentage, and a correspondence between different load power percentages and different optimal voltages is preset in the rule table; and determine that the second voltage is the optimal voltage.

* * * * *